United States Patent Office 2,993,893
Patented July 25, 1961

2,993,893
PREPARATION OF WATER-SOLUBLE COMPLEXES OF THIAZOLINE-RHODANINE DYES
Heman Dowd Hunt, New Shrewsbury, N.J., assignor to E. I. du Pont de Nemours and Company, Wilmington, Del., a corporation of Delaware
No Drawing. Filed Apr. 16, 1959, Ser. No. 806,741
5 Claims. (Cl. 260—240.4)

This invention relates to a process for the formation of water-soluble complexes of substantially water-insoluble neutral merocyanine dyes. More particularly, it relates to a process for preparing aqueous solutions of substantially water-insoluble neutral merocyanine dyes of the type useful as optical sensitizers in photography. Still more particularly, the invention relates to the preparation of water-soluble silver complexes of water-insoluble neutral merocyanine dyes containing a heterocyclic nitrogen nucleus derived from a heterocyclic nitrogen compound having a keto-methylene group and a sulfur atom in the hetrocyclic ring. Further, the invention relates to radiation-sensitive silver halide emulsions optically sensitized with the above water-soluble complexes and to photographic elements coated with these emulsions.

Many merocyanine dyes including those which contain nuclei derived from heterocyclic nitrogen compounds having a keto-methylene group and a sulfur atom in the heterocyclic ring are known. These dyes are generally incorporated from organic solvent solution with photographic silver halide emulsions in order to increase the spectral response of such emulsions. These merocyanine dyes are especially valuable as optical sensitizers in photographic paper emulsions having silver bromide or silver chloride as the main silver halide constituent and in high contrast lithographic type emulsions. The neutral merocyanine dyes leave less residual stain after processing than cationic cyanines and the anionic fluorescein type dyes used previously. However, because these neutral merocyanine dyes are substantially water-insoluble, they produce objectionable residual stain in developed and fixed photographic elements. Attempts have been made to overcome such stain by making water-soluble derivatives of such dyes. This has been accomplished by forming alkali metal or amine salts with acid groups attached to the keto-methylene nucleus or with an acid group attached to the nitrogen of the heterocyclic nucleus not containing a carbonyl group. However, such derivatives are difficult to make and involve complicated steps in their synthesis. They are not entirely satisfactory as water-soluble dyes because such dyes are not soluble in acid solutions which are sometimes used in coating filter layers. Complexes between silver and dyes are known but in all cases reported in the literature the complexes are water-insoluble or the dye is ionic in form. This is also true of silver rhodanine complexes which are used in microanalysis for specific silver spot tests. Such structures are those which when found in rhodanine-thiazoline type merocyanine dyes do not form soluble silver complexes. Silver ions are known to confer some solubility to simple aromatic systems through molecular complexes (L. J. Andrews, Chem. Rev., 54, 713 (1954)). No references to such complexes with molecules as large as merocyanine dyes have been found.

An object of this invention is to provide a new process for making water-soluble merocyanine dyes which are light-stable and have good optical sensitizing properties in photographic silver halide emulsions. Another object is to provide a simple and dependable process for making such dyes. Yet another object is to provide such a process which uses commercially available chemical complexing agents. A further object is to provide such a process which is of general application and can be used to convert neutral merocyanine dyes into water-soluble complexes. Still further objects will be apparent from the following description of the invention.

In accordance with the invention it has been found that light-stable, water-soluble complexes of neutral merocyanine dyes can be made by admixing a merocyanine dye with an aqueous solution of silver nitrate containing 0.50 to 300 moles, and preferably 0.5 to 0.75 mole of silver per mole of merocyanine dye at a temperature from 5° to 80° C. for a period of 0.1 to 30 minutes. If desired to facilitate formation of the complex, the aqueous solution may contain up to 50% by weight of a water-miscible neutral organic solvent, e.g., methanol, ethanol, acetone, tetrahydrofuran and pyridine. The solvents should dissolve merocyanine dyes but not react with them. Solutions of 0.01 M dye complex can be conveniently prepared in accordance with the invention and these solutions can be readily incorporated with aqueous water-permeable colloid light-sensitive silver halide emulsions or dispersions prior to coating the latter onto a suitable support to form a photographic element.

While the complexes can be made from neutral merocyanine dyes in general, the invention is particularly useful in making water-souble complexes from the thiazoline-rhodanine dyes of the general formula:

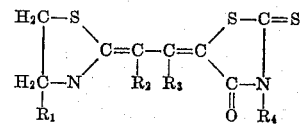

wherein $R_1$ and $R_4$ are the same or different radicals taken from the group consisting of an alkyl group of 1 to 4 carbon atoms, e.g., methyl, ethyl, n-propyl and n-butyl; cycloalkyl, e.g., cyclohexyl, carbalkoxyalkyl, e.g., carbethoxymethyl and carbethoxyethyl, acetoxyalkyl, e.g., acetoxyethyl and acetoxypropyl, and diacylamino, e.g., diacetylamino and dipropionylamino, and wherein one of the radicals $R_2$ and $R_3$ is hydrogen and the other is hydrogen or alkyl of 1–4 carbons as enumerated above, or aryl, e.g., phenyl, and may be the same or different. Dyes with substitutions on the thiazoline ring or with benzothiazole or benzoxazole nuclei require a rather high ratio of silver before being solubilized (of the order of 300:1 for effect of mass action law). In general, when $R_1$, $R_2$, $R_3$ and $R_4$ are alkyl groups containing two to four carbon atoms, the ability of the dye to form silver complexes is enhanced.

The silver-dye complexes made in accordance with this invention may be added to gelatin-silver halide emulsions from the aqueous solutions in which the complexes are formed and in amounts to give the equivalent amounts of uncomplexed dye normally used for optical sensitization. As is well known in the art, the amounts will vary depending upon the type of photographic silver halide emulsion and the manner in which it is to be used. Dyes which contain solubilizing groups such as carbalkoxy groups are already water-soluble in the proper pH range but complexing these dyes with silver ions is useful because the resulting complexes are soluble in acid solutions which is desirable under certain conditions.

The dye complexes are particularly useful in sensitizing silver halide gelatin emulsions for photographic papers. However, they are not limited to emulsions wherein gelatin is the sole binder as various other compatible water-permeable organic colloids can be admixed therewith. These colloids, which have protective colloid properties, may be of synthetic or natural origin and suitable ones are described in Alles U.S. Patent 2,779,684.

The invention will be further illustrated by but is not intended to be limited by the following examples.

Example I

To five $3 \times 10^{-3}$ molar aqueous ethanol solutions of silver nitrate containing 40% ethyl alcohol by volume there were added in an amount to give $0.5 \times 10^{-3}$, $0.72 \times 10^{-3}$, $1 \times 10^{-3}$, $2 \times 10^{-3}$ and $4 \times 10^{-3}$ molar concentrations respectively of a neutral merocyanine having the following formula:

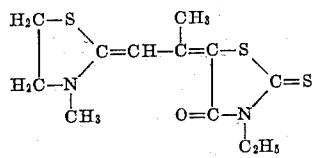

made according to Example I of Kendall, United States Patent 2,342,546. The ratio of silver to dye was 0.5 in all cases. The resulting solutions were clear and deep orange in color. 30 milliliter quantities of the respective silver-dye complex solutions were each added to a 300 gram quantity of a gelatin silver bromochloride emulsion having a halide ratio of about 70% chloride and 30% bromide. The portions of emulsions each contained 0.135 mole of silver halide. The dye was present in each emulsion in the quantities shown in the following table. To a similar quantity of emulsion there was added from an acetone solution a non-complexed dye according to the practice of the prior art. The emulsions were coated and dried in a conventional manner. The resulting photographic elements were tested by exposing suitable strips for 16 seconds in a IB sensitometer equipped with lamp No. 2, scale 81, filter 78AA, $K_2$ filter and $\sqrt{2}$ step wedge. Speed was determined at D.=2.0 with step 18 taken as relative speed=1. The exposed strips were developed in a solution of the following composition for 7 minutes at 68° F.

| | Grams |
|---|---|
| Sodium sulfite, anhydrous | 30.0 |
| Paraformaldehyde | 7.5 |
| Potassium metabisulfite | 2.5 |
| Boric acid, crystals | 7.5 |
| Hydroquinone | 22.5 |
| Potassium bromide | 1.5 |

Water to make 1 liter.

The results after fixing and drying are shown in the following table, said results being determined by a densitometer (Model RA-1100C manufactured by Electrical Research Products, Inc.).

| Emulsion | Micromoles Dye per 1.5 moles AgHal | Dye Conc. in Dye Solution | Fog | Relative Speed | |
|---|---|---|---|---|---|
| | | | | White light | $K_2$ Filter |
| Control | 110 | $1 \times 10^{-3}$ M (acetone) | .02 | 4.9 | 2.3 |
| 1 | 110 | $0.5 \times 10^{-3}$ M | .00 | 4.9 | 2.3 |
| 2 | 110 | $0.72 \times 10^{-3}$ M | .00 | 4.9 | 1.7 |
| 3 | 110 | $1 \times 10^{-3}$ M | .00 | 4.9 | 2.1 |
| 4 | 220 | $1 \times 10^{-3}$ M | .00 | 7.5 | 4.3 |
| 5 | 440 | $1 \times 10^{-3}$ M | .01 | 9.9 | 5.3 |
| 6 | 220 | $1 \times 10^{-3}$ M | .01 | 7.5 | 3.5 |
| 7 | 440 | $4 \times 10^{-3}$ M | .02 | 9.2 | 5.3 |

It will be observed that the silver-dye complex is equal to the non-complexed form of the dye in optical sensitizing power and also it did not have any adverse sensitometric effect on the emulsion.

Example II

A $3 \times 10^{-3}$ molar aqueous solution of silver nitrate was made and to this solution there was added at room temperature an amount to give a $1 \times 10^{-3}$ molar of a dye having a structure like that of Example I but having a $CH_3$ radical in place of the $C_2H_5$ radical. The resulting solution was deep orange in color and slightly viscous and turbid but suitable for addition to a silver halide emulsion for optical sensitization.

Example III

To a $3 \times 10^{-3}$ molar aqueous solution of silver nitrate there was added in an amount to give $1 \times 10^{-3}$ molar solution of a dye having the following structure:

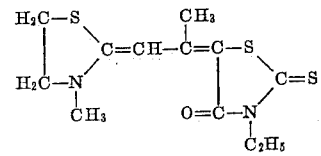

made according to Example I of U.S. Patent 2,342,546. The resulting solution was deep orange in color and slightly turbid and viscous. To this solution ethyl alcohol was added to the extent of providing 45% ethyl alcohol and the silver dye complex was present in an amount of $0.91 \times 10^{-5}$ M. The solution became clear and had an absorption peak at 498 m$\mu$, peak density of 0.815 and an extinction coefficient of $0.896 \times 10^{-5}$.

Example IV

To a $3 \times 10^{-3}$ molar aqueous solution of silver nitrate there was added in an amount to give a $1 \times 10^{-3}$ molar solution of a dye having the folowing structure:

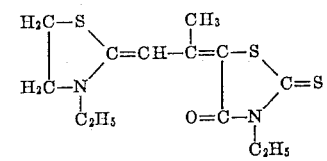

made according to the procedure taught by U.S. Patent 2,342,546. The resulting solution was a clear orange solution suitable for addition to a silver halide emulsion for optical sensitization.

Example V

To a $3 \times 10^{-3}$ molar aqueous solution of silver nitrate there was added an amount to give $1 \times 10^{-3}$ molar solution of a dye having the folowing structure:

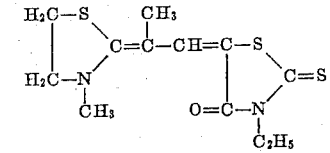

made according to the general procedure of Kendall, U.S. Patent 2,272,163. The resulting solution was a clear red solution suitable for addition to a silver halide emulsion for optical sensitization.

Example VI

To a $3 \times 10^{-3}$ molar aqueous solution of silver nitrate there was added an amount to give a $1 \times 10^{-3}$ molar solution, a dye having the following structure:

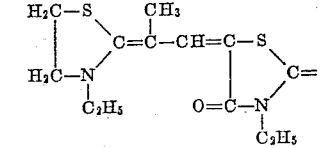

made according to the procedure taught by U.S. Patent 2,342,546. The resulting solution was a clear orange solution suitable for addition to a silver halide emulsion for optical sensitization.

Example VII

To a $3 \times 10^{-3}$ molar aqueous solution of silver nitrate there was added an amount to give $1 \times 10^{-3}$ molar concentration of a dye having the following structure:

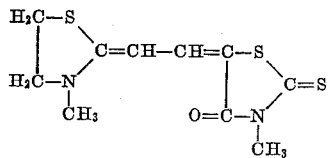

made according to the general procedure disclosed in Kendall U.S. Patent 2,265,908. The resulting solution was clear and light orange in color and suitable for addition to a molten gelatino-silver halide emulsion for optical sensitization.

*Example VIII*

To a $3 \times 10^{-3}$ molar aqueous solution of silver nitrate there was added an amount to give a $1 \times 10^{-3}$ molar concentration, a dye having the following structure:

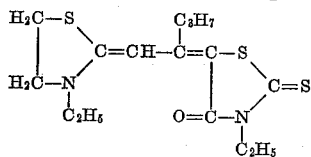

made according to the general procedure set forth in Kendall, U.S. Patent 2,272,163. The resulting solution was clear and deep red in color and suitable for optically sensitizing a gelatino-silver halide emulsion.

*Example IX*

To a $3 \times 10^{-3}$ molar aqueous solution of silver nitrate there was added an amount to give a $1 \times 10^{-3}$ molar concentration of a dye having the following structure:

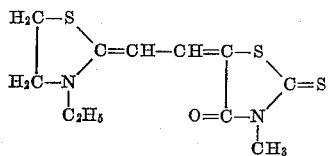

made according to the procedure set forth in Kendall U.S. Patent 2,265,908. The resulting solution was slightly turbid and orange in color. It was suitable for optically sensitizing a silver halide emulsion.

*Example X*

To a $3 \times 10^{-3}$ molar aqueous solution of silver nitrate there was added an amount to provide a $1 \times 10^{-3}$ molar concentration of a dye having the following structure:

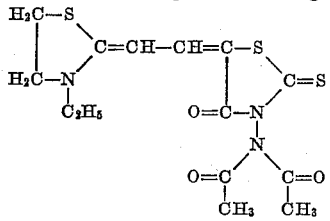

made according to the general procedure set forth in Brooker U.S. Patent 2,165,339. The resulting solution was clear and orange in color and suitable for optically sensitizing a gelatino-silver halide emulsion.

*Example XI*

To a $3 \times 10^{-3}$ molar aqueous solution of silver nitrate there was added an amount to provide a $1 \times 10^{-3}$ molar concentration of a dye having the following structure:

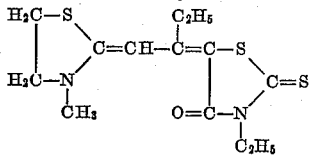

made according to Example IV of U.S. Patent 2,342,546.

The resulting solution was clear and orange in color and suitable for addition to a molten aqueous gelatino-silver halide emulsion for optical sensitization.

*Example XII*

To a $3 \times 10^{-3}$ molar aqueous solution of silver nitrate there was added an amount to provide a $1 \times 10^{-3}$ molar concentration a dye having the following structure:

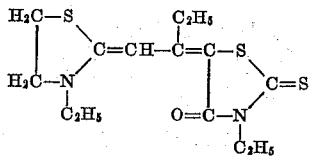

made according to the general procedure taught by Kendall U.S. Patent 2,342,546. The resulting solution was clear and deep red in color and suitable for optically sensitizing a photographic silver halide emulsion.

*Example XIII*

To a $3 \times 10^{-3}$ molar aqueous solution of silver nitrate there was added an amount to give a $1 \times 10^{-3}$ molar concentration of a dye having the following structure:

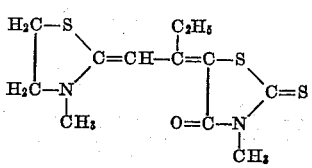

made according to the general procedure outlined in U.S. Patent 2,342,546. The resulting solution was clear and deep red in color and suitable for optically sensitizing a silver halide emulsion.

*Example XIV*

To a $3 \times 10^{-3}$ molar aqueous solution of silver nitrate there was added in an amount to give a $1 \times 10^{-3}$ molar concentration a dye having the following structure:

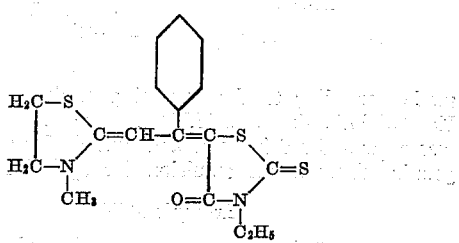

made as described in Example V of U.S. Patent 2,342,546. The resulting solution was clear and orange in color and suitable for optically sensitizing a gelatino-silver halide emulsion in a known manner.

*Example XV*

To a $3 \times 10^{-3}$ molar aqueous solution of silver nitrate there was added an amount to give a $1 \times 10^{-3}$ molar concentration of a dye having the following structure:

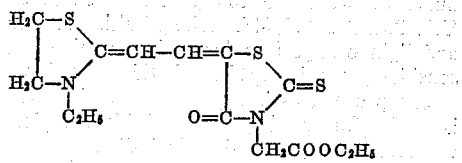

made according to the general method disclosed in Kendall U.S. Patent 2,265,908. The resulting solution was clear and orange in color and suitable for optically sensitizing a gelatino-silver halide emulsion.

*Example XVI*

To a $3 \times 10^{-3}$ molar aqueous solution of silver nitrate there was added in an amount to give a $1\times10^{-3}$ molar concentration of a dye having the following structure:

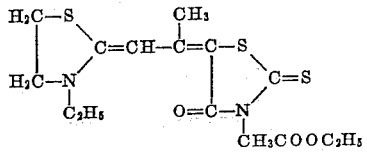

made according to the general procedure set forth in U.S. Patent 2,342,546. The resulting solution was clear and orange in color and suitable for optically sensitizing a gelatino-silver halide emulsion.

*Example XVII*

To a $3\times10^{-3}$ molar aqueous solution of silver nitrate there was added in an amount to give a $1\times10^{-3}$ molar concentration of a dye having the following structure:

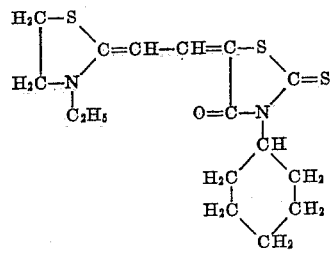

made according to the general procedure set forth in U.S. Patent 2,265,908. The resulting solution was clear and yellow in color. It was suitable for adding to a molten gelatino-silver halide emulsion for optical sensitization.

*Example XVIII*

To a $3\times10^{-3}$ molar aqueous solution of silver nitrate there was added in an amount to give a $1\times10^{-3}$ molar concentration of a dye of the following structure:

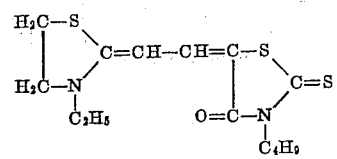

made according to the general procedure disclosed in Kendall U.S. Patent 2,265,908. The resulting solution was clear and red in color and suitable for addition to a gelatino-silver halide emulsion for optical sensitization.

*Example XIX*

To a $3\times10^{-3}$ molar aqueous solution of silver nitrate there was added in an amount to give a $1\times10^{-3}$ molar concentration of a dye having the following structure:

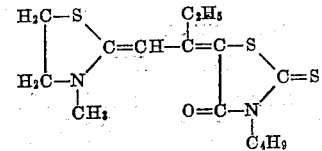

made according to the general procedure of Kendall U.S. Patent 2,342,546. The resulting solution was clear and light orange in color and was suitable for optically sensitizing a gelatino-silver halide emulsion.

The process, as is apparent from the above examples, is useful for making water-soluble complexes of many different merocyanine dyes including those coming within the generic formula preceding the working examples and the various specific dyes listed in the patents of the said examples. These water-soluble complexes are believed to be new compounds but their structure is not known with certainty. They contain combined silver which is linked to dye molecules in an amount of 0.5 mole of silver per mol of dye.

These merocyanine dye complexes have all of the uses of merocyanine dyes but due to their enhanced water-solubility in acid solutions can be used in manners in which the conventional dyes cannot be used. The complexes are useful for separating silver from other metals.

The complexes obtained by the processes of this invention have the primary advantage that they can be added to photographic emulsions from aqueous solutions which do not have a deleterious effect on a photographic silver halide emulsion. Another advantage is that it provides complexes which can be readily and completely dispersed in an aqueous photographic silver halide emulsion. A further advantage is that the invention provides a simple and dependable method for making light-stable, water-soluble complexes of neutral merocyanine dyes.

What is claimed is:

1. A process for the formation of water-soluble complexes of water-insoluble merocyanine dyes which comprises admixing a merocyanine dye of the formula.

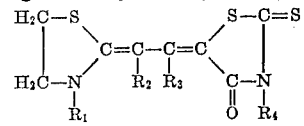

wherein $R_1$ and $R_4$ are each independently taken from the group consisting of alkyl from 1 to 4 carbons, cycloalkyl, carbalkoxyalkyl, diacetylamino and dipropionylamino and one of the radicals $R_2$ and $R_3$ is hydrogen and the other is taken from the group consisting of hydrogen, alkyl of 1–4 carbons and carbocyclic aryl with an aqueous solution containing silver nitrate in an amount sufficient to provide 0.5 to 300 moles of silver per mole of merocyanine dye and at least 50% by weight of water, any other solvent present being taken from the group consisting of methanol, ethanol, acetone, tetrahydrofurane, and pyridine.

2. A process according to claim 1 wherein water is the sole solvent medium present.

3. A process according to claim 1 wherein the aqueous solution contains 40% to 50% by weight of ethanol based on the weight of the water.

4. A process according to claim 1 wherein the amount of silver nitrate is sufficient to provide 0.5 to 0.75 mole of silver per mol of merocyanine dye.

5. A process which comprises admixing a cynanine dye of the formula

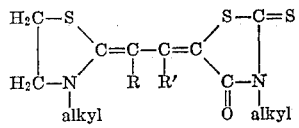

wherein alkyl contains 2 to 4 carbon atoms and one of the radicals R and R' is hydrogen and the other is alkyl of 1 to 4 carbons with an aqueous solution containing silver nitrate in an amount sufficient to provide 0.5 to 300 moles of silver per mole of merocyanine dye and at least 50% by weight of water, any other solvent present being taken from the group consisting of methanol, ethanol, acetone, tetrahydrofurane, and pyridine.

References Cited in the file of this patent
UNITED STATES PATENTS 2,272,163    Kendall _____ Feb. 3, 1942
2,342,546    Kendall _____ Feb. 22, 1944

OTHER REFERENCES

Natanson: Acta Physiochemica USSR, vol. 21, No. 3, pages 431 to 436 (1946).

Hunig: Annalen der Chemie, vol. 574, pages 112 to 121 (1951).

Jenny: Helv. Chim. Acta., vol. 34, pp. 539–554 (1951).

Chemical Abstracts, vol. 48, page 7465 (1954) [Abstract of Japanese Patent 3086 (1953)].

Chemical Abstracts, vol. 50, pages 9926–27 (1956) [Abstract of Pokrovskaya et al. Zhur. Fiz. Khim, vol. 30, pages 161–7 (1956)].